United States Patent
Lüttmann

(10) Patent No.: US 11,807,359 B2
(45) Date of Patent: Nov. 7, 2023

(54) FLOW BODY TORSION BOX WITH IMPROVED FATIGUE BEHAVIOR

(71) Applicant: Airbus Operations GmbH, Hamburg (DE)

(72) Inventor: Henrik Lüttmann, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 17/699,308

(22) Filed: Mar. 21, 2022

(65) Prior Publication Data

US 2022/0306275 A1    Sep. 29, 2022

(30) Foreign Application Priority Data

Mar. 23, 2021    (DE) .......................... 102021107279.4

(51) Int. Cl.
*B64C 3/26* (2006.01)
*B64C 3/18* (2006.01)

(52) U.S. Cl.
CPC .............. *B64C 3/26* (2013.01); *B64C 3/185* (2013.01); *B64C 3/187* (2013.01)

(58) Field of Classification Search
CPC .. B64C 3/26; B64C 3/18; B64C 3/182; B64C 3/185; B64C 3/187
See application file for complete search history.

(56) References Cited

U.S. PATENT DOCUMENTS

| | | | |
|---|---|---|---|
| 11,136,108 B2 | 10/2021 | Selyugin et al. | |
| 2008/0128554 A1* | 6/2008 | Pham | B64C 3/182 244/131 |
| 2009/0001218 A1 | 1/2009 | Munoz Lopez et al. | |
| 2011/0303357 A1 | 12/2011 | Plaza et al. | |
| 2018/0072400 A1* | 3/2018 | Deobald | B64C 1/064 |
| 2020/0216162 A1 | 7/2020 | Graham | |

FOREIGN PATENT DOCUMENTS

| | | |
|---|---|---|
| EP | 2759470 A2 | 7/2014 |
| EP | 2173615 B1 | 9/2016 |
| EP | 3530452 A1 | 8/2019 |
| WO | 2019064004 A1 | 4/2019 |

OTHER PUBLICATIONS

German Search Report; priority document.

* cited by examiner

*Primary Examiner* — Philip J Bonzell
*Assistant Examiner* — Eric Acosta
(74) *Attorney, Agent, or Firm* — Greer, Burns & Crain, Ltd.

(57) ABSTRACT

A flow body torsion box includes a plurality of ribs, a first spar attached to a first end of the ribs, a second spar attached to a second end of the ribs, a first skin, and a second skin. The first skin and the second skin are arranged at a distance to each other to enclose the ribs and the spars. The first skin and the second skin are attached to the ribs and the spars through tie elements to form a torsion box. The tie elements comprise a first attachment end and a second attachment end between which the tie elements are at least partially curved so as to be resiliently deformable along a first direction along a connection line between the first attachment end and the second attachment end.

11 Claims, 3 Drawing Sheets

FLOW BODY TORSION BOX WITH IMPROVED FATIGUE BEHAVIOR

CROSS-REFERENCES TO RELATED APPLICATIONS

This application claims the benefit of the German patent application No. 102021107279.4 filed on Mar. 23, 2021, the entire disclosures of which are incorporated herein by way of reference.

FIELD OF THE INVENTION

The invention relates to a flow body torsion box and an aircraft, comprising at least one flow body having such a flow body torsion box.

BACKGROUND OF THE INVENTION

Flow bodies for aircraft, such as wings, tail planes or the like, often comprise a torsion box. A torsion box is to be understood as a stiffened structure having a plurality of stiffening elements that are connected to and covered by outer skins. It is designed to resist a load-induced torsion while having a low weight. Loads to be transferred between the stiffening elements and the skins are largely driven by the stiffness of both. However, as the attachment of the stiffening elements and the skins often comprises a large number of individual connections, which may lead to a statically over-determinate arrangement. For example, in corners between spars and skins or ribs and skins, attachment angles may transfer a high percentage of tension/compression instead of shear loads. This may lead to a demand for further stiffening the structure.

SUMMARY OF THE INVENTION

It is an object of the invention to provide an alternative flow body torsion box, with reduced interface loads in corner regions.

A flow body torsion box is proposed, comprising a plurality of ribs, a first spar attached to a first end of the ribs, a second spar attached to a second end of the ribs, a first skin, and a second skin, wherein the first skin and the second skin are arranged at a distance to each other to enclose the ribs and the spars, wherein the first skin and the second skin are attached to the ribs and the spars through tie elements to form a torsion box. According to the invention, the tie elements comprise a first attachment end and a second attachment end between which the tie elements are at least partially curved so as to be resiliently deformable along a first direction along a connection line between the first attachment end and the second attachment end.

The flow body torsion box is a closed box-like structure that is delimited by the first spar, the second spar, the first skin and the second skin. The first skin and the second skin may extend from the first spar to the second spar on a first side of the torsion box and on an opposite second side of the torsion box, respectively. The skins define the outer shape of the torsion box and may be curved in a desired way. The skins may be directly exposed to an airflow in operation of the aircraft that comprises the flow body torsion box.

The first spar and the second spar may be arranged parallel to each other, but the invention is not limited to such an arrangement. Also, additional spars may be arranged between the first spar and the second spar and may also be attached to the skins.

At least a part of the ribs may be arranged parallel to each other. The ribs may comprise a flat, surface-like structure. They may be arranged between the first spar and the second spar.

The first skin and the second skin may additionally comprise longitudinal stiffening elements in the form of stringers or the like. The stringers may be integral parts of the skins or may be separate parts attached to the skins. The skins may thus be stiffened in one direction. It is preferred to let the ribs and the stringers run in transverse directions. The ribs or the longitudinal stiffening elements require cutouts to let the stiffening elements or ribs pass. It is preferred that the longitudinal stiffening elements are continuous and without cutouts, while the ribs comprise cutouts for letting the longitudinal stiffening elements pass.

The structural elements of the torsion box are attached to each other through the tie elements. These comprise a first attachment end and a second attachment end, which are arranged at a distance to each other. It is preferred that the tie elements comprise a low thickness, which may be in the region of the thickness of a rib and/or a spar and/or a skin. The first attachment end and the second attachment end may be realized in the form of lugs that are designed to lay flat upon the respective structural element. It is conceivable that the first attachment end and the second attachment end enclose an angle in the range of 60° to 120° to each other. An intermediate section is arranged between the first and second attachment ends and comprises the curved shape.

A gist of the invention lies in designing the tie elements such that they provide a resilient behavior in a first direction and a substantially stiff behavior in a second direction, wherein the first direction and the second direction are transverse to each other. Instead of attracting more and more load by stiffening the flow body torsion box, it is thus proposed to reduce local stiffnesses and the interface loads to be transferred by the tie elements. Loads at corners of the skin and the spars can thus be reduced and the overall weight of the torsion box is reduced. Also, the fatigue behavior is improved.

While the flow body torsion box may be designed according to the above principle from the start, it is also conceivable that the tie elements are retrofittable to already existing torsion boxes.

In an advantageous embodiment the tie elements are curved about at least one axis substantially parallel to an expected main shear load direction at the second attachment end. The tie elements are thus designed to not comprise any reduction in stiffness in the main shear load transfer direction. This is accomplished by aligning the at least one axis to be parallel to the expected main shear load direction. It is to be understood that several axes may be provided, which are parallel to each other and the main shear load direction, respectively. A plurality of curved sections may follow on each other, wherein the curved sections may comprise the same curvature direction, different curvature directions and different curvature radii.

In another advantageous embodiment, the main shear load direction at the second attachment end is parallel to an intersection line of a main extension plane of the respective rib or spar and the respective spar or skin, to which the second attachment end is attached. The tie elements may thus extend from the rib or spar in the direction of the respective main extension plane, while they are curved on this course to at least slightly leave the extension plane in a vertical direction thereto.

In an advantageous embodiment, the first attachment end is an integral part of the respective spar or rib. Thus, the spar or rib may comprise extensions in the form of tie elements or cutouts to define the tie elements in between. The first attachment end thus does not need to be attached to the spar or rib in a separate step. The spar or rib may this comprise a reduced weight in comparison to conventional techniques.

It is advantageous if the tie elements comprise a fiber-reinforced plastic material having at least one layer of reinforcement fibers embedded into a matrix. The shape of the tie elements may be defined through pressing or molding tools. By choosing suitable fiber directions the stiffness in various spatial directions as well as the main load transfer direction can be supported.

In an advantageous embodiment the tie elements comprise at least two layers of reinforcement fibers, wherein the layers comprise two distinct fiber directions, wherein the two fiber directions enclose an angle in a range of 60° to 120°. Both fiber directions may exemplarily enclose an angle of about 90°, such that two layers of reinforcement fibers may be created with fiber directions of +/−45° relative to a certain extension axis.

Advantageously, the two fiber directions are symmetrical relative to the connection line. The connection line is the intersection line between the main extension planes of the rib or spar and the respective spar or skin.

The fiber-reinforced plastic material may comprise a fiber reinforced thermoplastic or thermoset plastics material. The reinforcing fibers may be carbon allotropes, for example carbon fibers, carbon nanotubes, graphene or similar However, glass fibers or aramid fibers could also be suitable. The matrix material may comprise PPS, PEEK, PEKK, PEI, PAEK or others. Especially in combination with reinforcing fibers, these materials comprise high strength and a comparatively high continuous operation temperature.

In an advantageous embodiment the tie elements are curved in an S shape. By this design, a spring-elastic, resilient behavior can be achieved, wherein the compressibility of the tie elements mainly depend on the curvature radii and the curvature angles.

The invention further relates to an aircraft, comprising at least one flow body according to the above description.

The flow body may comprise at least one of a group of flow bodies, the group comprising a main wing, a winglet, a horizontal tailplane, a vertical tailplane, elements of a V tail, and a foreplane.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION OF THE PREFERRED EMBODIMENTS

Figure 1:
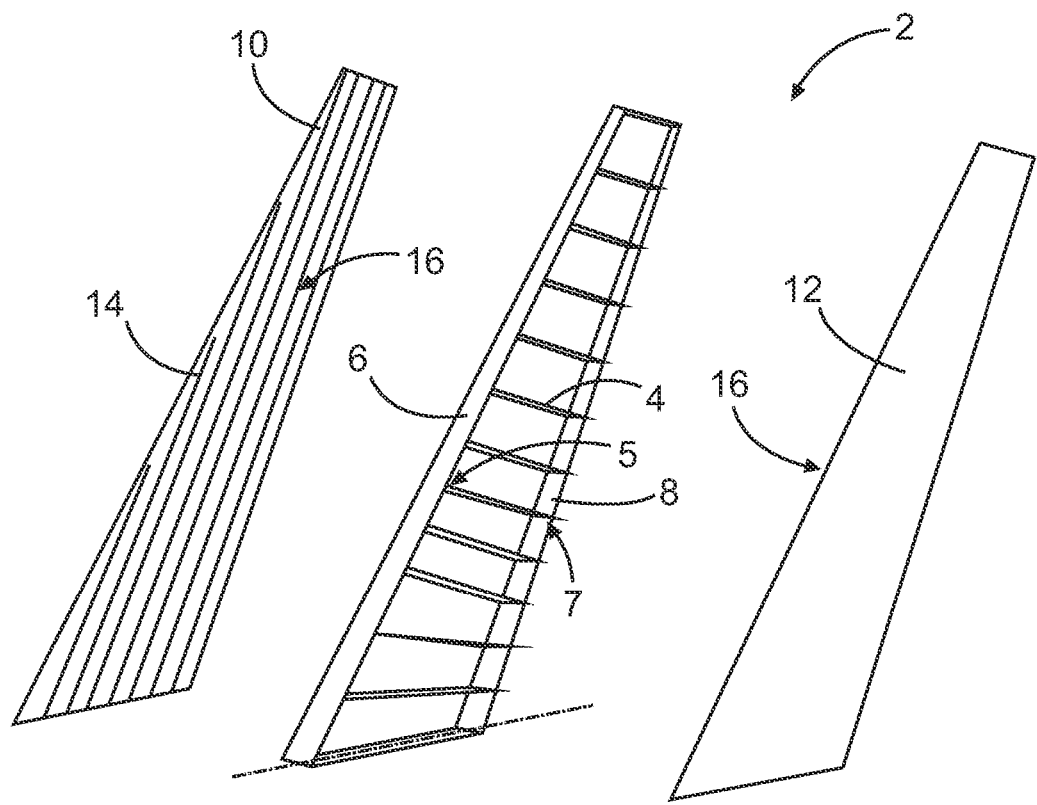
FIG. 1 shows an exploded view of a flow body torsion box.

FIG. 1 shows a first exemplary embodiment of a flow body torsion box 2 in an exploded view. Here, a plurality of ribs 4, a first spar 6 and a second spar 8 are attached to each other to form a grid-like stiffening structure. The first spar 6 is attached to first ends 5 of the ribs 4, while the second spar 8 is attached to second ends 7 of the ribs 4. A first skin 10 and a second skin 12 are provided to enclose the ribs and the spars to form a flow body torsion box. The skins 10 and 12 comprise longitudinal stiffening elements 14 arranged on inner sides 16 in the form of stringers or the like.

Figure 2:
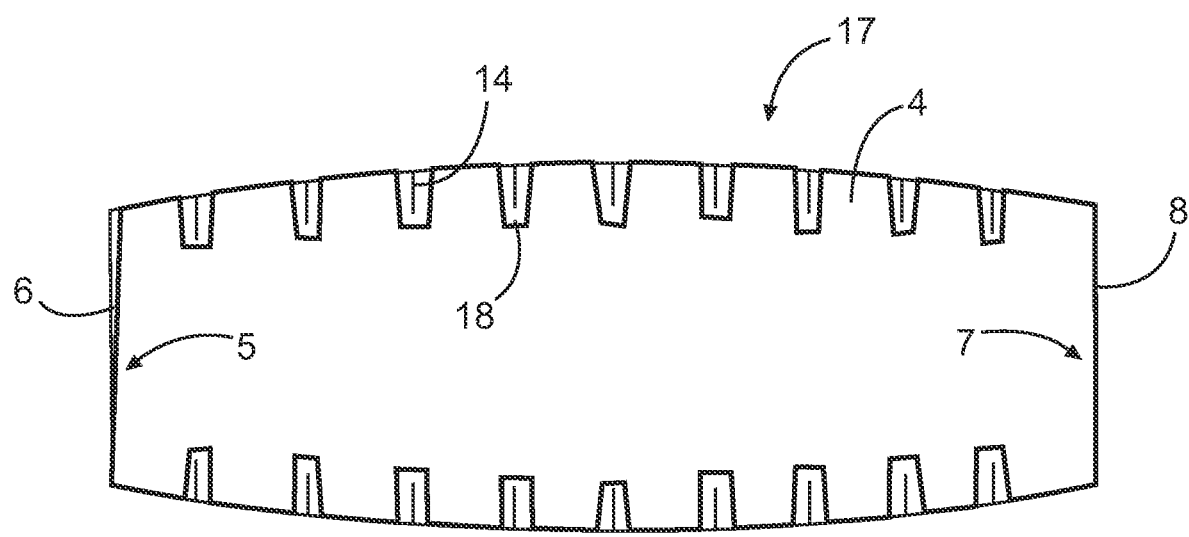
FIG. 2 shows a sectional view of the flow body torsion box.

The ribs 4 of a torsion box 17 exemplarily comprise a design as shown in FIG. 2. Here, a plurality of cutouts 18 are provided in the ribs 4 to allow continuous extensions of the longitudinal stiffening elements 14. However, it is to be understood that this design may be inverted in a way that the ribs 4 comprise a continuous extension, while the longitudinal stiffening elements 14 comprise cutouts for leading the ribs through.

Figure 3:
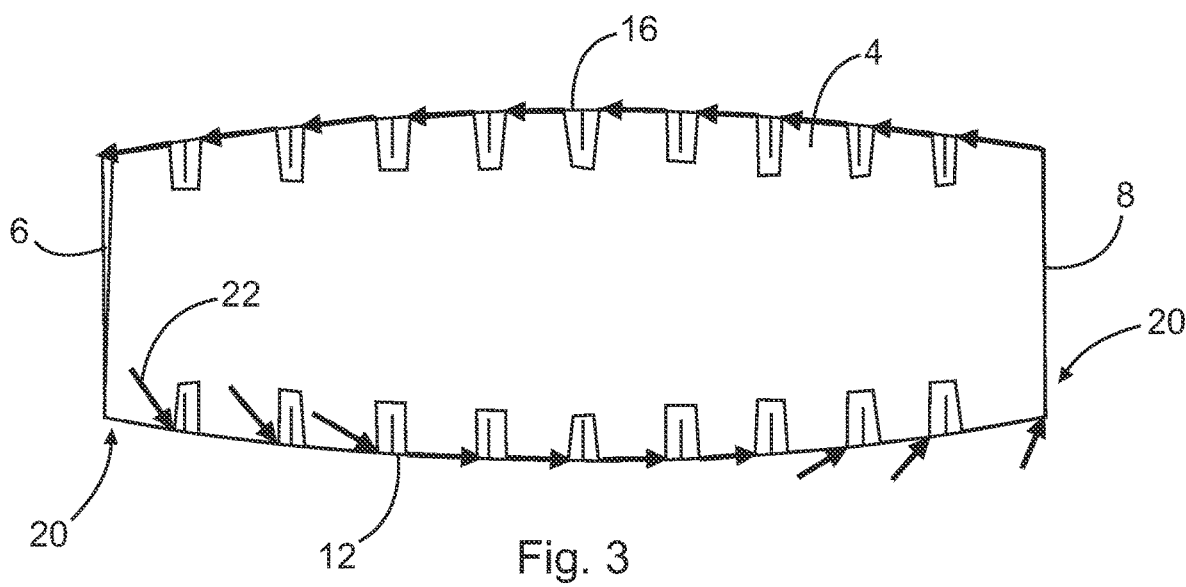
FIG. 3 shows the sectional view of FIG. 2 with indicated loads in conventional design.

FIG. 3 shows a rib 4 with a conventional attachment to the first spar 6, the second spar 8, the first skin 10 and the second skin 12. Here, simple brackets are used to connect the ribs 4, spars 6, 8 and skins 10, 12. In doing so, an over-determinate attachment results. Here, corner regions 20 may exist, where local loads 22 in operation are not limited to shear loads, but also comprise distinct force components perpendicular to the skins 10 and 12. This is not desired in the design of torsion boxes.

Figure 4:
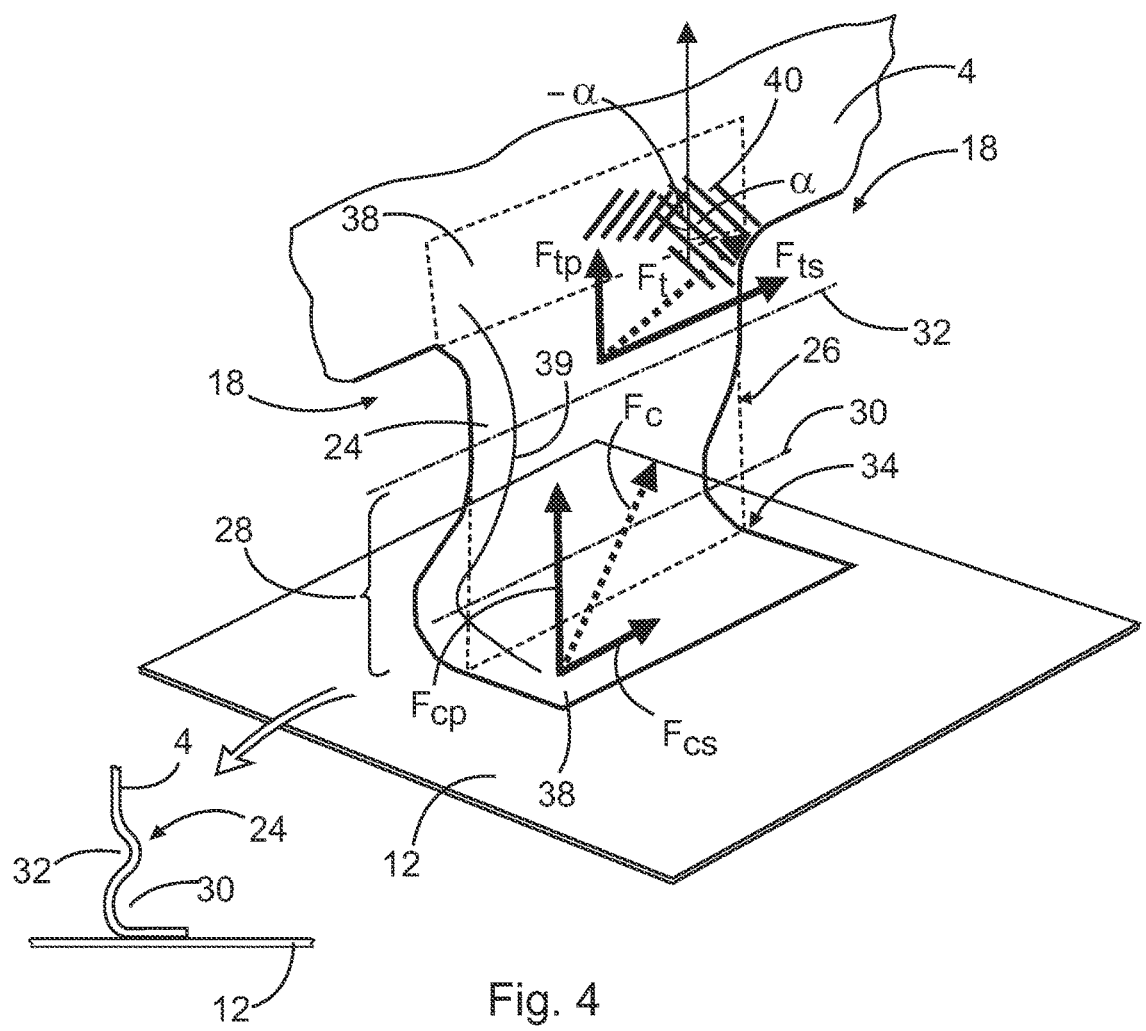
FIG. 4 shows a spatial view of a tie element.

For providing improved loads 22, i.e., mainly shear loads, the tie element 24 as illustrated in FIG. 4 is provided. Here, a section of the rib 4 is shown, which is attached on the second skin 12 through the tie element 24. The remaining attachments to the spars 6, 8 and the first skin 10 may be provided in a similar way.

A conventional design of a bracket is indicated by dashed lines 26. These extend in the extension plane of the rib 4 and are simply beveled to be attached to the second skin 12. Here, for example, rivets are used for attachment. A rivet force Fc is generated, which includes a shear component Fcs and a perpendicular force Fcp. It is apparent that the perpendicular force Fcp is a substantial force that may even exceed the shear component Fcs.

The tie element 24 according to the invention however has a curved section 28. This leads to the tie element 24 partially bulging out from an extension plane of the rib 4. In the illustrated exemplary embodiment it is curved about two axes 30 and 32, which are parallel to an intersection line 34 of the main extension plane of the rib 4 and of the second skin 12. By this design, the tie element 24 comprises a resilient behavior in a direction perpendicular to the second skin 12, which decreases the generation of loads in a direction perpendicular to the second skin 12. However, shear forces parallel to the intersection line 34 are maintained. Thus, the tie elements 24 softens the connection of the rib 4 and the second skin 12 in a single load direction and thereby reduces the tension/compression loads on the attachment angle. The reduced interface stiffness reduces the fatigue loads on the structure.

The tie elements 24 may be made of a fiber reinforced material. In this illustration, also the rib 4 is made of a composite material and the tie element 24 is an integral part of the rib 4. A first attachment end 36 of the tie element 24 is thus an integral part of the rib 4 and is arranged between the cutouts 18. The tie elements 24 also comprise a second attachment end 38, which is folded and flushly rests on the second skin 12. The tie element 24 is curved along a connection line 39 between the first attachment end 36 and the second attachment end 38. For improving the load transfer in this manner, the tie element 24 exemplarily comprises at least two layers 40 of reinforcement fibers. The fibers of the layers 40 enclose an angle α of +/−45° to an axis 42 that is arranged perpendicular to the second skin 12.

The second attachment end 38 may be attached to the second skin 12 through rivets. The load acting on the rivets is shown as Ft, which comprises a shear load component Fts and a perpendicular load component Ftp, which is clearly lower than Fcp of a rivet connected to a conventional bracket.

Figure 5:
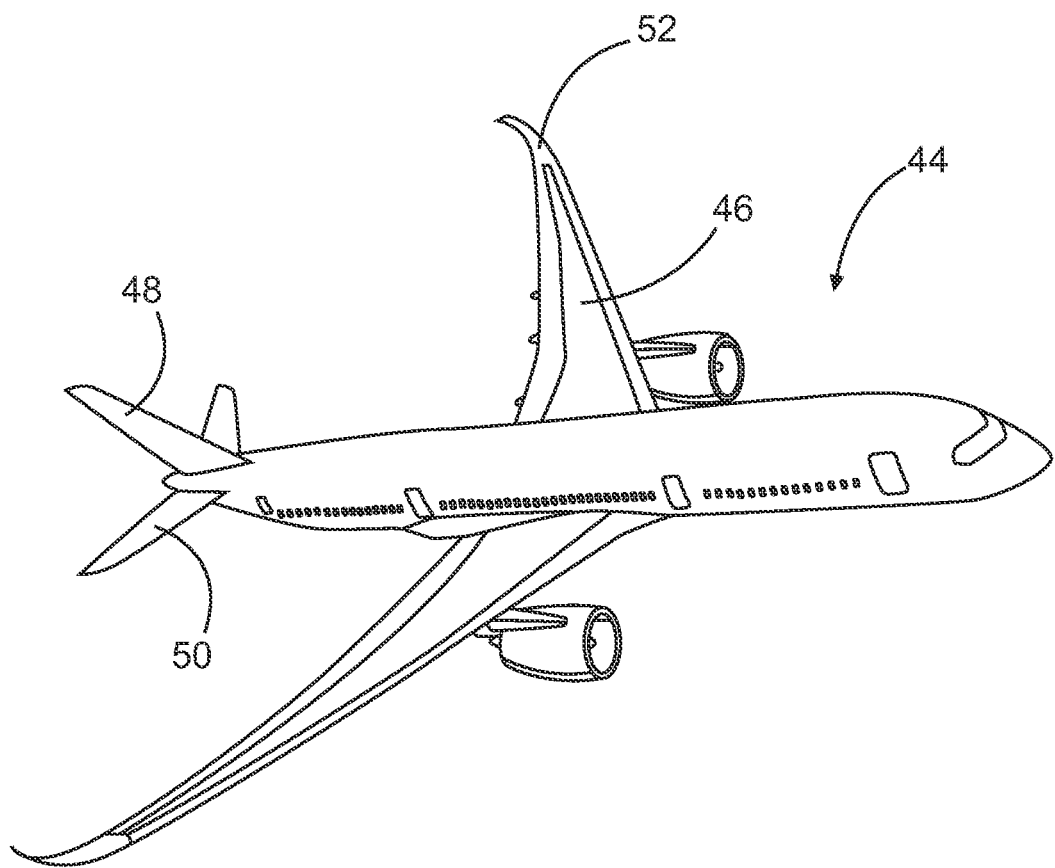
FIG. 5 shows a perspective view of an airplane embodying the principles of the present invention.

FIG. 5 shows an aircraft 44 having wings 46, a vertical tail plane 48, horizontal tail planes 50 and winglets 52. The wings 46 and/or the vertical tail plane 48 and/or the horizontal tail planes 50 and/or the winglets 52 comprises a flow body torsion box 17 as described above.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 flow body torsion box
4 rib
5 first end
6 first spar
7 second end
8 second spar
10 first skin
12 second skin
14 longitudinal stiffening element
16 inner side
17 torsion box
18 cutout
20 corner region
22 load (improved)
24 tie element
26 conventional design of a bracket
28 curved section
30 axis of curvature
32 axis of curvature
34 intersection line
36 first attachment end
38 second attachment end
40 layer
42 axis
44 aircraft
46 wing
48 vertical tail plane
50 horizontal tail plane
52 winglet
α angle

The invention claimed is:

1. A flow body torsion box, comprising
a plurality of ribs,
a first spar attached to a first end of the ribs,
a second spar attached to a second end of the ribs,
a first skin, and
a second skin,
wherein the first skin and the second skin are arranged at a distance to each other to enclose the ribs and the spars,
wherein the first skin and the second skin are attached to the ribs and the spars through tie elements to form a torsion box,
wherein the tie elements comprise a first attachment end and a second attachment end between which the tie elements are at least partially curved so as to be resiliently deformable along a first direction along a connection line between the first attachment end and the second attachment end, and
wherein the first attachment end lies in a first plane which is perpendicular to a second plane in which the second attachment lies.

2. The flow body torsion box according to claim 1, wherein the tie elements are curved about at least one axis substantially parallel to a main shear load direction parallel to a length of the ribs at the second attachment end.

3. The flow body torsion box according to claim 2, wherein the main shear load direction at the second attachment end is parallel to an intersection line of a main extension plane of the respective rib or spar and the respective spar or skin, to which the second attachment end is attached.

4. The flow body torsion box according to claim 1, wherein the first attachment end is an integral part of the respective spar or rib.

5. The flow body torsion box according to claim 1, wherein the tie elements comprise a fiber-reinforced plastic material having at least one layer of reinforcement fibers embedded into a matrix.

6. The flow body torsion box according to claim 1, the tie elements are curved in a S shape.

7. An aircraft, comprising at least one flow body having a flow body torsion box according to claim 1.

8. The aircraft according to claim 7, wherein the flow body is at least one of a group of flow bodies, the group comprising:
a main wing,
a winglet,
a horizontal tailplane,
a vertical tailplane,
elements of a V tail, and
a foreplane.

9. A flow body torsion box, comprising
a plurality of ribs,
a first spar attached to a first end of the ribs,
a second spar attached to a second end of the ribs,
a first skin, and
a second skin, wherein the first skin and the second skin are arranged at a distance to each other to enclose the ribs and the spars, wherein the first skin and the second skin are attached to the ribs and the spars through tie elements to form a torsion box, and wherein the tie elements comprise a first attachment end and a second attachment end between which the tie elements are at least partially curved so as to be resiliently deformable along a first direction along a connection line between the first attachment end and the second attachment end.

wherein the tie elements-comprise at least two layers of reinforcement fibers embedded into a matrix, wherein the at least two layers comprise two distinct fiber directions, wherein the two fiber directions enclose an angle in a range of 60° to 1200.

10. The flow body torsion box according to claim 9, wherein the two fiber directions are symmetrical relative to the connection line.

11. The flow body torsion box according to claim 6, wherein the fiber-reinforced plastic material comprises a fiber reinforced thermoplastic or thermoset plastics material.

* * * * *